(12) United States Patent
Jehle et al.

(10) Patent No.: US 11,125,326 B2
(45) Date of Patent: Sep. 21, 2021

(54) METHOD AND CONTROL APPARATUS FOR DETERMINING REFERENCE VALUES OF A SENSOR

(71) Applicant: ZF Friedrichshafen AG, Friedrichshafen (DE)

(72) Inventors: Martina Jehle, Kressbronn (DE); Christian Pannek, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/700,726

(22) Filed: Dec. 2, 2019

(65) Prior Publication Data

US 2020/0173547 A1 Jun. 4, 2020

(30) Foreign Application Priority Data

Dec. 3, 2018 (DE) ...................... 10 2018 220 875.1

(51) Int. Cl.
*F16D 11/14* (2006.01)
*F16H 61/14* (2006.01)
(Continued)

(52) U.S. Cl.
CPC ............. *F16H 61/14* (2013.01); *F16D 11/14* (2013.01); *G01D 5/145* (2013.01); *G01D 5/16* (2013.01); *F16H 59/16* (2013.01)

(58) Field of Classification Search
CPC .......... F16H 61/14; F16H 59/16; F16H 61/04; F16H 2342/04; F16H 2061/0474; F16H 59/68; F16H 2059/6807; F16H 2061/283; F16H 2200/2064; F16H 61/686; F16H 63/42; F16H 61/0204; F16H 2200/2012; F16H 2200/0065; F16H 2200/2046; G01D 5/145; G01D 5/16; G01D 3/063; F16D 11/14; F16D 2500/3027; F16D 2500/3023; F16D 2500/30406; F16D 2500/30426; F16D 2500/30412; F16D 2500/5018;
(Continued)

(56) References Cited

U.S. PATENT DOCUMENTS

| 7,789,792 B2 | 9/2010 | Kamm et al. |
| 8,398,522 B2 | 3/2013 | Bauknecht et al. |

(Continued)

FOREIGN PATENT DOCUMENTS

| DE | 102005002337 A1 | 8/2006 |
| DE | 102008000429 A1 | 9/2009 |

*Primary Examiner* — Justin Holmes
(74) *Attorney, Agent, or Firm* — Dority & Manning, P.A.

(57) ABSTRACT

A method for determining reference values of a sensor is provided. The reference values correspond to a disengaged operating condition or to an engaged operating condition of a form-locking shift element (A, F). With the aid of the sensor, at least one operating parameter of the shift element (A, F) determinable during a disengagement and during an engagement of the shift element (A, F). A torque, an actuation force of the shift element (A, F), and a differential speed between shift-element halves of the shift element (A, F) are varied during the determination of the reference values of the sensor in such that the form-locking shift element (A, F) is transferred into the disengaged operating condition or into the engaged operating condition.

15 Claims, 3 Drawing Sheets

(51) Int. Cl.
   *G01D 5/14*      (2006.01)
   *G01D 5/16*      (2006.01)
   *F16H 59/16*     (2006.01)

(58) Field of Classification Search
   CPC ... F16D 2500/5012; F16D 2500/30401; F16D 2500/10462; F16D 2300/18
   See application file for complete search history.

(56) References Cited

U.S. PATENT DOCUMENTS

| | | | |
|---|---|---|---|
| 2014/0209426 A1* | 7/2014 | Mori | F16D 11/10 |
| | | | 192/69.8 |
| 2019/0003586 A1* | 1/2019 | Merienne | F16D 21/00 |

* cited by examiner

METHOD AND CONTROL APPARATUS FOR DETERMINING REFERENCE VALUES OF A SENSOR

CROSS-REFERENCE TO RELATED APPLICATION

The present application is related and has right of priority to German Patent Application No. 10 2018 220 875.1 filed on Dec. 3, 2018, the entirety of which is incorporated by reference for all purposes.

FIELD OF THE INVENTION

The invention relates generally to a method for determining reference values of a sensor. Moreover, the invention relates generally to a control unit for carrying out the method as well as to a corresponding computer program.

BACKGROUND

DE 10 2005 002 337 A1 describes an eight-speed multi-stage transmission including friction-locking shift elements. The shift elements are multi-disk clutches or multi-disk brakes. In the presence of a shift request for a ratio change in the transmission, at least one of the friction-locking shift elements is to be disengaged from the power flow of the transmission device and at least one further friction-locking shift element is to be engaged into the power flow of the transmission device, in order to transmit a torque.

In general, in the presence of a demand to disengage a friction-locking shift element, regardless of the torque presently transmitted via the friction-locking shift element, it is assumed that the friction-locking shift element is actually transitioning into the disengaged operating condition. To the same extent, a demand to engage a friction-locking shift element is also implementable using comparatively little outlay for open-loop and closed-loop control.

For this reason, a simple software-based evaluation of an actuating current of a pressure regulator of a friction-locking shift element is sufficient. During the determination of an appropriate disengagement control signal or an appropriate engagement control signal for transferring the friction-locking shift element into its disengaged operating condition or its engaged operating condition, respectively, it can be easily verified whether a shift change or a gear change was successful via such an evaluation.

Disadvantageously, however, friction-locking shift elements in the disengaged operating condition cause drag torques, which adversely affect an overall efficiency of an automatic transmission to an undesirable extent.

For this reason, transmission devices, such as those described in DE 10 2008 000 429 A1, increasingly include not only friction-locking shift elements but also form-locking shift elements. These types of form-locking shift elements usually include two shift-element halves. The shift-element halves are brought into form-locking engagement with each other via axial displacement of at least one movable shift-element half with respect to the other shift-element half, which is not axially displaceable, at dog elements, or the like. Thereupon, the form-locking shift element is engaged and transmits an applied torque. Moreover, it is also possible that both shift-element halves are axially movable with respect to each other.

If the form-locking shift element is to be disengaged from the power flow, the positive engagement between the shift-element halves is disengaged via axial displacement of the movable shift-element half with respect to the axially fixed shift-element half. Form-locking shift elements are used because, in contrast to friction-locking shift elements, essentially no drag torques occur with disengaged form-locking shift elements. Drag torques adversely affect the overall efficiency of a transmission. However, form-locking shift elements, as compared to friction-locking shift elements, are transferable out of a disengaged operating condition, in which no torque is transmitted via the form-locking shift elements, into their engaged operating condition only close to their synchronous speed.

Additionally, form-locking shift elements engaged into the power flow of a transmission device are disengageable from the power flow or transferable into their disengaged operating condition using low shifting forces if the applied torque has an appropriately low value. During gear change operations, or gear disengagement operations, a power flow between a transmission input shaft and a transmission output shaft is interrupted in the transmission. In this case, a form-locking shift element is to be transferred, if necessary, from its engaged operating condition into its disengaged operating condition. Due to an excessively rapid or faulty build-up of the torque applied at the form-locking shift element, or due to a faulty reduction of the applied torque, the form-locking shift element may not be transferable into its disengaged operating condition. In addition, it is also possible that mechanical, hydraulic, or electrical malfunctions prevent the disengagement of a form-locking shift element. For this reason, form-locking shift elements, in contrast to friction-locking shift elements, do not necessarily transition into a disengaged operating condition in the presence of an appropriate disengagement control signal.

Additionally, it is also possible that a disengaged form-locking shift element is not transferable into its engaged operating condition within desirably short operating times. This is the case, for example, when the sought positive engagement between the shift-element halves cannot be established due to a so-called tooth-on-tooth position. In the event of such a tooth-on-tooth position, dog elements of the shift-element halves rest against one another at their end faces and the differential speed between the shift-element halves is zero. Such a tooth-on-tooth position is released only when a torque present at the form-locking shift element is greater than the static friction torque between the end faces of the dog elements of the shift-element halves.

Moreover, the establishment of a complete positive engagement between the shift-element halves or the complete engagement of a form-locking shift element is also preventable by a so-called flank clamping between the flanks of the dog elements. In the event of such a flank clamping, the two shift element halves have an axial overlap of their dog elements. However, the static friction between the flanks of the dog elements of the shift-element halves, which are resting against one another, is so high that the engagement force acting on the shift elements in the engagement direction is not sufficient to overcome the static friction and completely engage the form-locking shift element.

Sensors are installed in order to be able to monitor the current operating condition of a form-locking shift element. These sensors include, for example, a permanent magnet and a measuring unit for sensing the magnetic field of the permanent magnet. Additionally, the sensors have a ferromagnetic sensor contour, which influences the magnetic field of the permanent magnet depending on the operating conditions of the shift-element halves. Various magnetic field-sensing elements are known, such as magnetoresistive sensors or Hall effect sensors. Magnetic field sensors generally include elements sensing a magnetic field or other electronic components, wherein some magnetic field sensors include permanent magnets in a back-biased arrangement.

These types of magnetic field sensors provide electrical signals, which represent the condition of a sensed magnetic field. Some magnetic field sensors cooperate with ferromagnetic objects. With the aid of the magnetic field sensors, magnetic field fluctuations are determined, which are caused by an object moved through the magnetic field of a magnet of a magnetic field sensor. The magnetic field monitored with the aid of the magnetic field sensor also varies depending on a shape or a profile of the moving ferromagnetic object. The position determination of the shift-element halves is calculated directly from the raw signals of the sensors with the aid of applicable thresholds.

The values of the sensor signal have a non-negligible scattering, which does not allow for a precise determination of a current dog position. For this reason, a value range of the sensor signal is utilized in each case for the determination, by the sensor, of a current dog position, which is delimited for the relevant dog position by the particular maximum sensor signal that has been received and by the minimum sensor signal that has been received. Additionally, the values of the signal of such a sensor also vary depending on a position change of the overall form-locking shift element of a transmission with respect to the sensor. Such a position change results from so-called gear clearance, which varies depending on the particular torque to be transmitted via the transmission and depending on manufacturing tolerances of the transmission and of the form-locking shift element.

Disadvantageously, all tolerances of the sensor and of the sensing system, as well as the production-related scatterings, therefore flow into the position determination. As a result, the position determination of the shift-element halves does not have the accuracy necessary for operating a transmission.

SUMMARY OF THE INVENTION

Starting from the above-described background, example aspects of the invention provide a method for determining reference values of a sensor, with the aid of which an operating condition of a form-locking shift element can be determined in an easy way with great accuracy. Additionally, a control unit, which is designed for carrying out the method, and a computer program for carrying out the method are provided.

A method is provided for determining reference values of a sensor, which correspond to a disengaged operating condition or to an engaged operating condition of a form-locking shift element. With the aid of the sensor, at least one operating parameter of the shift element can be determined during a disengagement and during an engagement of the shift element.

In the present case, for example, constant-mesh shift elements or dog clutches, which transmit a torque via a form-locking connection, are described herein under the term "form-locking shift element". Moreover, shift elements, which transmit a torque via a friction-locking connection, including clutches or brakes, are described herein under the term "friction-locking shift element". The torque transmittable with the aid of such a friction-locking shift element varies depending on the particular engagement force applied to the friction-locking shift element and is preferably infinitely variable. The engagement force corresponds, for example, to a hydraulic pressure applied to the shift element. In contrast thereto, the torque transmittable with the aid of a form-locking shift element is not infinitely variable.

Moreover, in the present case, the term "reference values of a sensor" is understood to mean values of a sensor signal that correspond to a current operating condition of a form-locking shift element. In particular, these are the sensor values that are determined, by the sensor, in the end positions of a movable shift-element half, whose axial actuating movement is monitored with the aid of the sensor. The two end positions of a movable shift-element half correspond to a completely engaged operating condition and to a completely disengaged operating condition of the form-locking shift element.

Example aspects of the invention disclose that a torque present at the shift element, an actuation force of the shift element, and a differential speed between the shift-element halves of the shift element are varied during the determination of the reference values of the sensor in such a way that, in the presence of an appropriate demand, the form-locking shift element is transferred into a disengaged operating condition or into an engaged operating condition.

In other words, it is ensured with the aid of the approach according to example aspects of the invention that the form-locking shift element is actuated, during the determination of the reference values of the sensor, to such an extent that the form-locking shift element is transferred, with the necessary probability, into the demanded operating condition, for which the particular reference value of the sensor corresponding thereto is to be determined.

Therefore, a learning routine is available for the determination of the dog end positions, which correspond to a completely disengaged operating condition and to a completely engaged operating condition of a form-locking shift element, respectively. Via this learning routine, sensor values corresponding to the dog end positions can be determined for each transmission in a specimen-specific manner, i.e., for each form-locking shift element of a transmission individually and with the desired accuracy. The determined sensor values are saved or stored, for example, in a non-volatile memory.

This advantageously offers the possibility of carrying out the determination of the dog position or the position of the shift-element halves with respect to each other during the subsequent operation of a transmission that includes the form-locking shift element with the aid of generally valid parameters or reference values of a sensor on the basis of the determined end positions. The learning routine can also be carried out after an exchange, replacement, servicing, etc. of a control unit, a transmission, or a sensor.

In an example variant of the method according to the invention, an actuation force, which is greater than a threshold value and acts in the disengagement direction of the shift element, is applied to the shift element during the determination of the reference value of the sensor that corresponds to the disengaged operating condition of the shift element. It is advantageous if the threshold value nearly corresponds to the actuation force that is the maximum possible and acts in the disengagement direction of the form-locking shift element. Thereupon, the form-locking shift element very likely transitions into its disengaged operating condition as demanded.

In an example variant of the method according to the invention, a torque present at the shift element is adjusted to values less than a threshold value during the determination of the reference value of the sensor that corresponds to the disengaged operating condition of the shift element. Therefore, it can be ensured, in a simple way, that the form-locking shift element is transferred into its disengaged operating condition as demanded and the reference value of the sensor corresponding thereto is determined with great accuracy.

In an example variant of the method according to the invention, a differential speed between the shift-element halves of the form-locking shift element is adjusted, in each case, to values within a speed range during the determination of the reference value of the sensor that corresponds to the engaged operating condition of the shift element. The speed range encompasses the zero point of the differential speed or the synchronous speed of the form-locking shift element. Within the speed range, the shift-element halves can be brought into engagement with each other in a form-locking manner. With the aid of this approach, it is very likely ensured that the form-locking shift element is transferred into its engaged operating condition as demanded and the reference value of the sensor corresponding thereto can be determined with great accuracy.

In a further advantageous example variant of the method according to the invention, a torque present at the shift element is adjusted, in each case, to values greater than a threshold value during the determination of the reference value of the sensor that corresponds to the engaged operating condition of the shift element and before a positive engagement between the shift-element halves. The threshold value of the torque advantageously corresponds to a torque value, above which a tooth-on-tooth position between the shift-element halves of the shift element does not take place. The threshold value corresponds to a limit of the torque value present at the shift element, above which a static friction possibly present between the shift-element halves, which are not yet in overlap, is overcome. Therefore, the establishment of the demanded positive engagement can be carried out to the desired extent.

In a further advantageous example variant of the method according to the invention, an actuation force present at the shift element is adjusted, in each case, to values less than a threshold value during the determination of the reference value of the sensor that corresponds to the engaged operating condition and before a positive engagement between the shift-element halves. The threshold value advantageously represents a limit of the actuation force, below which a tooth-on-tooth position between the shift-element halves does not take place and the form-locking shift element can be transferred into its engaged operating condition. With the aid of this approach, it is ensured that static friction does not build up between the shift-element halves, which are not yet in overlap, which facilitates or brings about a tooth-on-tooth position and prevents the engagement of the form-locking shift element.

Moreover, a torque present at the shift element may be adjusted, in each case, to values less than a threshold value during the determination of the reference value of the sensor that corresponds to the engaged operating condition and in the presence of a positive engagement between the shift-element halves. The threshold value advantageously represents a limit of the torque, below which a flank clamping between the shift-element halves does not take place and the form-locking shift element can be transferred into its engaged operating condition to the desired extent.

In addition, an actuation force present at the shift element may be adjusted, in each case, to values greater than a threshold value during the determination of the reference value of the sensor that corresponds to the engaged operating condition and in the presence of a positive engagement between the shift-element halves. Advantageously, the threshold value is defined in such a way that, upon an actuation of the shift element with an actuation force above the threshold value, a flank clamping between the shift-element halves does not take place and the shift element can be transferred into its engaged operating condition. As a result, the reference value of the sensor that corresponds to the engaged operating condition of the shift element can be determined with the desired great accuracy.

In a further advantageous example variant of the method according to the invention, the reference values of the sensor are determined several times in succession. The determined reference values are compared to one another. In the case of a determination of a deviation between the reference values within a tolerance range, the reference values are permanently stored.

In this approach, the possibility that the form-locking shift element has not transferred into the completely disengaged operating condition or into the completely engaged operating condition and a faulty determination of the reference values takes place during the determination of the reference values of the sensor is ruled out.

In an example variant of the method according to the invention, which can be carried out with little outlay for open-loop and closed-loop control, the operating parameter of the shift element corresponds to a travel of a shift-element half of the shift element, which is designed to be displaceable in a translatory manner with respect to the other shift-element half of the form-locking shift element.

In a further advantageous example variant of the method according to the invention, the torque present at the form-locking shift element is varied by way of an appropriate actuation of friction-locking shift elements of a transmission if the form-locking shift element is a shift element of the transmission.

Alternatively or additionally, it is also possible to vary the torque present at the form-locking shift element by appropriately adjusting a torque present at the transmission input shaft if the transmission comprises a transmission input shaft. This can be implemented, for example, in an easy way, by varying a drive torque of a prime mover of a vehicle drive train, which is operatively connected to the transmission input shaft.

The invention also relates generally to a control unit, which is designed for carrying out the method according to example aspects of the invention. The control unit includes, for example, means utilized for carrying out the method according to the invention. These means can be hardware-related means and software-related means. The hardware-related means of the control unit or of the control device are, for example, data interfaces for exchanging data with the assemblies of the vehicle drive train contributing to the carrying-out of the method according to example aspects of the invention. Further hardware-related means are, for example, a memory for data storage and a processor for data processing. Software-related means can be, inter alia, program modules for carrying out the method according to example aspects of the invention.

In order to carry out the method according to example aspects of the invention, the control unit can be operated using at least one receive interface, which is designed for receiving signals from signal transmitters. The signal transmitters can be designed, for example, as sensors, which gather measured quantities and transmit them to the control unit. A signal transmitter can also be referred to as a signal sensing element. In this way, the receive interface can receive a signal from a signal transmitter, via which it is signaled that a reference value of a sensor is to be determined. The signal can be generated, for example, by an operator, in that the operator actuates a control element, via which such a determination can be demanded. Moreover, the signal can also be generated by a driving strategy, which is activated and carried out in the area of the control unit or in the area of a further control unit of the vehicle drive train.

The control unit can also include a data processing unit, in order to evaluate and/or process the received input signals or the information of the received input signals.

The control unit can also be designed including a transmit interface, which is designed for outputting control signals to actuating elements. An actuating element is understood to be actuators that implement the commands of the control unit. The actuators can be designed, for example, as electromagnetic valves.

If, during the actuation of the form-locking shift element, it is detected with the aid of the control unit for determining reference values of a sensor or if it is determined on the basis of received input signals that at least one operating parameter of the shift element is to be determined, with the aid of the sensor, during a disengagement or during an engagement of the shift element, then the control unit determines an appropriate demand on the basis of detected input signals and initiates an appropriate determination. The reference values correspond to a disengaged operating condition or to an engaged operating condition of the form-locking shift element. The control unit is designed in such a way that a torque present at the shift element, an actuation force of the shift element, and a differential speed between the shift-element halves can be varied during the determination of the reference values of the sensor in such a way that the form-locking shift element can be transferred into its disengaged operating condition or into its engaged operating condition.

As a result, it is ensured, in a simple way, that the shift element is transferred into the particular demanded operating condition and the reference values can be determined with great accuracy.

The aforementioned signals are to be considered merely as examples and are not to limit the invention. The gathered input signals and the output control signals can be transmitted via a vehicle bus, for example, via a CAN-BUS. The control device or the control unit can be designed, for example, as a central electronic control unit of the vehicle drive train or as an electronic transmission control unit.

The approach according to example aspects of the invention can also be embodied as a computer program product, which, when running on a processor of a control device, instructs the processor from the software point of view to carry out the assigned method steps, which are subjects of the invention. In this context, a machine-readable medium, on which an above-described computer program product is retrievably stored, is also a subject of the invention.

The invention is not limited to the specified combination of features of the independent claims or the claims dependent thereon. In addition, individual features can be combined with one another, provided they arise from the claims, the description of embodiments that follows, or directly from the drawing. References in the claims to the drawings via the use of reference characters is not intended to limit the scope of protection of the claims.

BRIEF DESCRIPTION OF THE DRAWINGS

Preferred refinements result from the dependent claims and the following description. An exemplary embodiment of the invention is explained in greater detail with reference to the drawing, without being limited thereto. Wherein:

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
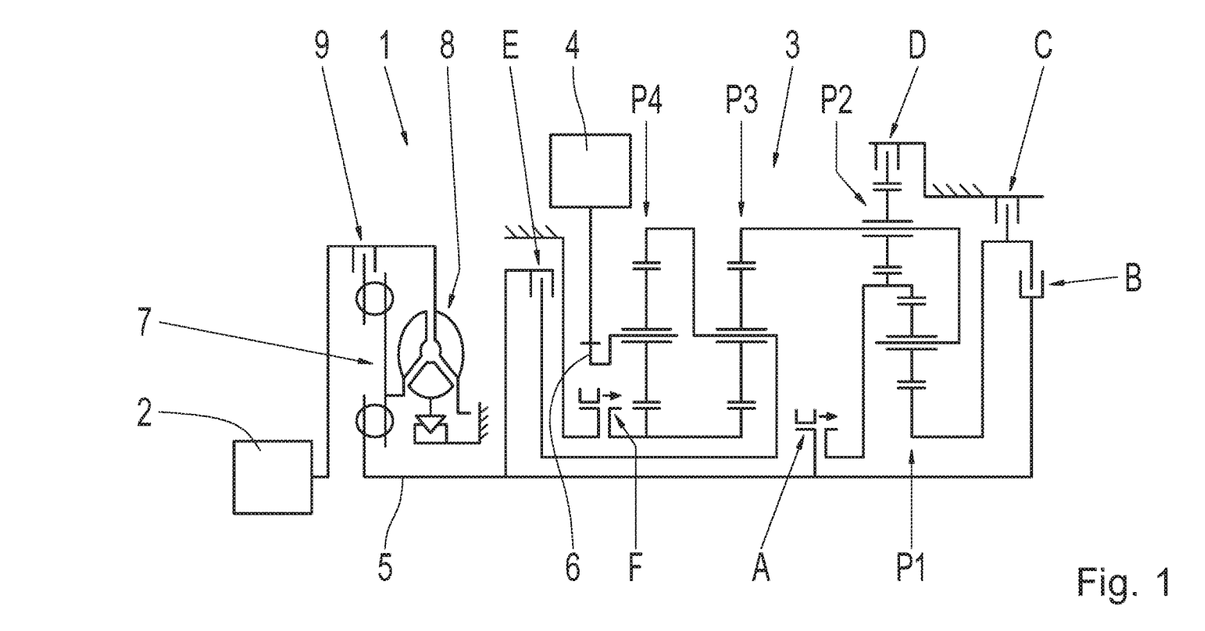
FIG. 1 shows a schematic of a vehicle drive train including a prime mover, a transmission, and a driven end.

FIG. 1 shows a schematic of a vehicle drive train 1 including a prime mover 2, a transmission 3, and a driven end 4. The prime mover 2 is an internal combustion engine in this case. The transmission 3 is an automatic transmission, in which multiple gears "1" through "9" for forward travel and at least one gear "R" for travel in reverse are implementable. Depending on the particular configuration of the vehicle drive train 1, the driven end 4 includes one, two, or more drivable vehicle axles, to which the torque of the prime mover 2 is applicable via the transmission 3. The transmission 3 includes a first hydraulically actuatable shift element A, a second hydraulically actuatable shift element B, a third hydraulically actuatable shift element C, a fourth hydraulically actuatable shift element D, a fifth hydraulically actuatable shift element E, and a sixth hydraulically actuatable shift element F. Hydraulically actuatable shift elements A through F are actuated during a ratio change in the transmission 3, i.e., during upshifts or downshifts. The ratio changes are to be carried out essentially without an interruption of tractive force, in combination with a high level of ride comfort and at a desired level of performance. The term "performance" is understood to mean, in each case, a ratio change in the transmission 3 that is implemented within a defined operating time.

In order to be able to carry out the particular demanded gear shift to the desired extent, shift elements A through F are each acted upon by shift sequences stored in a transmission control unit and a shift pressure corresponding to the particular shift sequence.

The transmission 3 includes a transmission input shaft 5 and a transmission output shaft 6. The transmission output shaft 6 is connected to the driven end 4. In the present case, a torsion damper 7 and, as a starting component, a hydrodynamic torque converter 8 including an associated torque converter lockup clutch 9 are arranged between the transmission input shaft 5 and the prime mover 2.

In addition, the transmission 3 includes four planetary gear sets P1 through P4, in particular a first planetary gear set P1, a second planetary gear set P2, a third planetary gear set P3, and a fourth planetary gear set P4. The first planetary gear set P1 and the second planetary gear set P2, which are preferably designed as minus planetary gear sets, form a shiftable front-mounted gear set. The third planetary gear set P3 and the fourth planetary gear set P4 represent a main gear set. The shift elements C, D, and F of the transmission 3 are designed as brakes, while the shift elements A, B, and E represent separating clutches.

Figure 2:
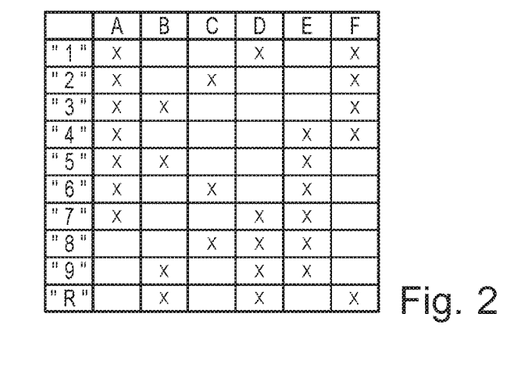
FIG. 2 shows a shift logic, in table form, of the transmission shown in FIG. 1.

A selective shifting of the gear stages "1" through "R" can be implemented with the aid of the shift elements A through F according to the shift logic represented in greater detail in FIG. 2. In order to establish a power flow in the transmission, essentially three of the shift elements A through F are to be transferred into or held in an engaged operating condition essentially simultaneously in each case.

The shift elements A and F are designed, in this case, as form-locking shift elements without additional synchronization. As a result, in the case of the transmission 3, as compared to transmissions including only friction-locking shift elements, drag torques caused by disengaged friction-locking shift elements are reduced.

As is known, form-locking shift elements are generally transferable out of a disengaged operating condition into an engaged operating condition only within a very narrow differential speed range, encompassing the synchronous speed, between the shift-element halves to be brought into an operative connection with one another in a form-locking manner. If the synchronization of a form-locking shift element to be engaged cannot be carried out with the aid of additional structural embodiments, the synchronization is implemented via an appropriate actuation of the further friction-locking shift elements contributing to the gear shift and/or a so-called engine override. During such an engine override, for example, the drive torque made available by the prime mover 2 is varied in the coasting condition as well as in the traction operation of the vehicle drive train 1 to the extent necessary for the synchronization. This also applies for the actuation of the friction-locking shift elements during the carrying-out of demanded traction or coasting shifts.

Figure 3A:
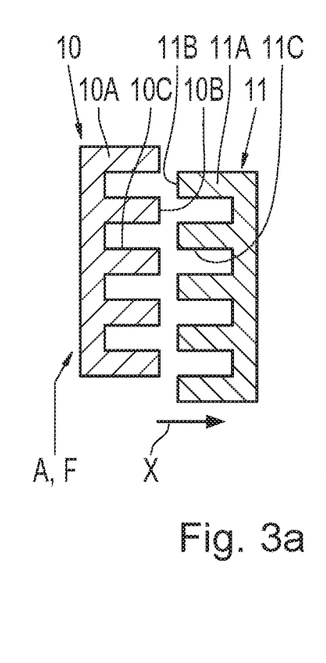
FIG. 3a through FIG. 3e each show various operating conditions of a form-locking shift element, which is represented in a highly schematic manner, between a completely disengaged condition and a completely engaged condition.

FIG. 3a through FIG. 3e each show two shift-element halves 10, 11 of the form-locking shift element A through F in various operating conditions. FIG. 3a shows the completely disengaged operating condition of the form-locking shift element A through F, in which there is no positive engagement between the two shift-element halves 10 and 11 and in which the shift-element halves 10 and 11 are spaced apart from each other in the axial direction x.

The shift-element halves 10 and 11 include dog elements 10A and 11A, respectively. The dog elements 10A and 11A can be brought into engagement with one another in a form-locking manner depending on the particular current application via axial displacement of the shift-element half 10 and/or of the shift-element half 11 relative to the shift-element half 11 or the shift-element half 10, respectively, in order to be able to transmit a torque present at the form-locking shift element A or F to the desired extent.

In the presence of an appropriate demand to engage the form-locking shift element A or F, an appropriate actuation force is applied in the engagement direction at the particular displaceably designed shift-element half 10 or 11. As a result, the axial distance between the end faces 10B and 11B of the dog elements 10A and 11A, respectively, facing one another is increasingly reduced.

If the differential speed between the shift-element halves 10 and 11 is too great, the dog elements 10A and 11A cannot be brought into engagement with one another in a form-locking manner. In such a case, a rattling occurs, during which the dog elements 10A and 11A glide off of one another, at their facing end faces 10B and 11B, in the circumferential direction of the shift-element halves 10 and 11 to the extent shown in FIG. 3b. Such a rattling is undesirable, however, since it causes irreversible damage in the area of the dog elements 10A and 11A as the period of operation increases.

Figure 3B:
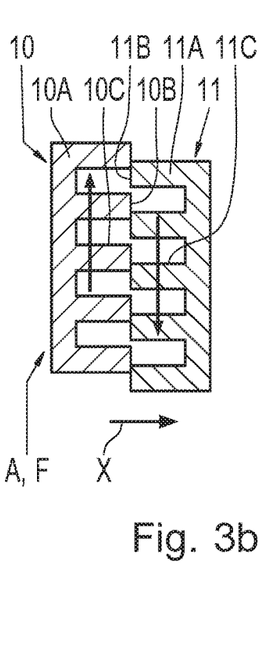

For this reason, the differential speed between the shift-element halves 10 and 11 is adjusted to values within a differential speed window, which encompasses the synchronous speed of the form-locking shift element A or F, via appropriate actuation of the particular friction-locking shift elements B through E contributing to the operating condition change in the transmission 3. Within this differential speed window, the dog elements 10A and 11A of the shift-element halves 10 and 11, respectively, can be brought into engagement with each other in a form-locking manner to the desired extent.

Figure 3C:
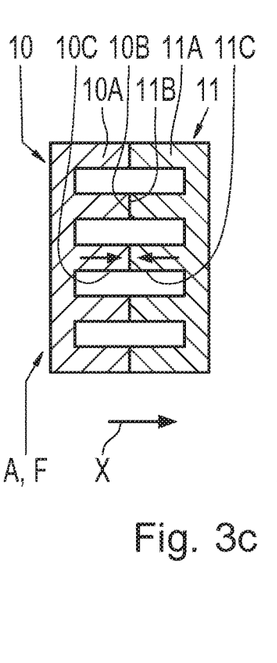

It should be noted, however, that the positive engagement to be established can be prevented by a so-called tooth-on-tooth position between the shift-element halves 10 and 11. The tooth-on-tooth position, as represented in FIG. 3c, is characterized in that the dog elements 10A and 11A rest against one another in the area of their end faces 10B and 11B, respectively, and the differential speed between the shift-element halves 10 and 11 is zero. During such a tooth-on-tooth position of the form-locking shift element A or F, the static friction between the end faces 10B and 11B of the dog elements 10A and 11A, respectively, is so great that the torque present at the form-locking shift element A or F is transmitted via the form-locking shift element A or F without the tooth-on-tooth position being released or unmeshed.

In order to release the tooth-on-tooth position, it is advantageous if the actuation force acting on the form-locking shift element A or F in the engagement direction is reduced and/or the torque present at the form-locking shift element A or F is increased. The static friction in the area between the end faces 10B and 11B of the dog elements 10A and 11A, respectively, is lowered via the reduction of the engagement force.

Simultaneously, by raising the torque present at the form-locking shift element A or F, the static friction between the end faces 10B and 11B is overcome and the differential speed between the shift-element halves 10 and 11 increases to an extent that enables the positive engagement between the dog elements 10A and 11A to be established.

Figure 3D:
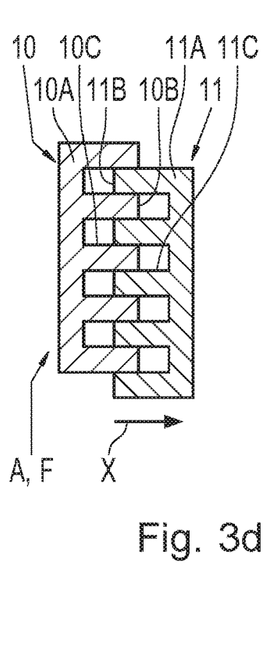

FIG. 3d shows an operating condition of the form-locking shift element A or F, in which a positive engagement between the shift-element halves 10 and 11 is present with a so-called partial overlap of the dog elements 10A and 11A. Such an operating condition is present during a disengagement process as well as during an engagement process of the form-locking shift element A or F.

The torque acting on the shift element A or F and the coefficients of friction of the flanks 10C and 11C yield a static friction force, which acts between the flanks 10C, 11C. If the actuation force acting on the shift-element halves 10 and 11 in the disengagement direction or in the engagement direction of the form-locking shift element A or F is too low in relation to the static friction force between the flanks 10C and 11C of the dog elements 10A and 11A, respectively, flank clamping occurs. During such a flank clamping, the axial relative actuating movement between the shift-element halves 10 and 11 in the engagement direction or in the disengagement direction is zero, and so the demanded operating condition change of the form-locking shift element A or F does not take place. In order to prevent or release such a flank clamping, the actuation force acting on the shift element A or F, for example, is raised and/or the particular torque present at the form-locking shift element A or F is reduced to the extent necessary for this purpose.

Figure 3E:
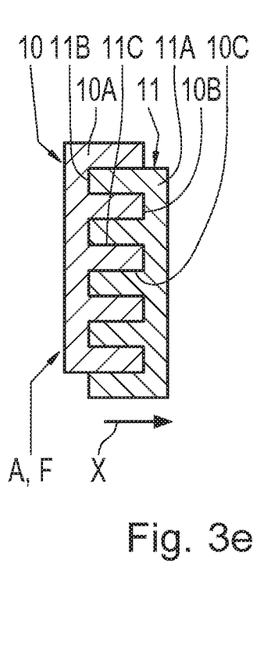

The completely engaged operating condition of the form-locking shift element A or F is represented in FIG. 3e, in which the full overlap between the dog elements 10A and 11A in the axial direction x is present.

FIG. 4a through FIG. 4f each show a representation of the form-locking shift element A or F corresponding to FIG. 3a. In the case of the shift element A or F, the dog elements 10A and 11A of the shift-element halves 10 and 11, respectively, which are arranged next to one another in the circumferential direction of the shift-element halves 10 and 11, each have a different length in the axial direction x. In the following, the longer dog elements are described in greater detail with reference to reference numbers 10A1 and 11A1 and the shorter dog elements are described in greater detail with reference to reference numbers 10A2 and 11A2.

This embodiment of the form-locking shift elements A and F offers the advantage that the positive engagement between the shift-element halves 10 and 11 can be established at higher differential speeds between the shift-element halves 10 and 11 than is the case with the embodiment of the form-locking shift elements A and F represented in FIG. 3a through FIG. 3e. In contrast thereto, the embodiment of the form-locking shift element A or F according to FIG. 4a through FIG. 4f is less robust against rattling as compared to the embodiment of the form-locking shift element A and F according to FIG. 3a through FIG. 3e.

The shift element A or F can have further operating conditions, due to the dog elements 10A1, 10A2 as well as 11A1 and 11A2 designed having different lengths, in addition to the operating conditions of the form-locking shift element A or F described with reference to FIG. 3a through FIG. 3e. The further operating conditions will be described in greater detail in the following description of FIG. 4a through FIG. 4f.

Figure 4A:
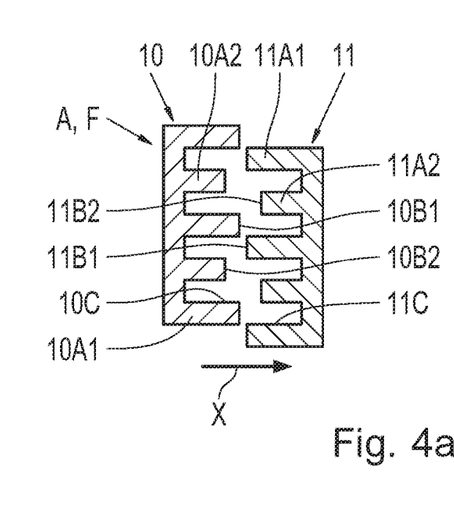
FIG. 4a through FIG. 4f each show representations corresponding to FIG. 3a of various operating conditions of a form-locking shift element, whose dog elements have different lengths.
Figure 4B:
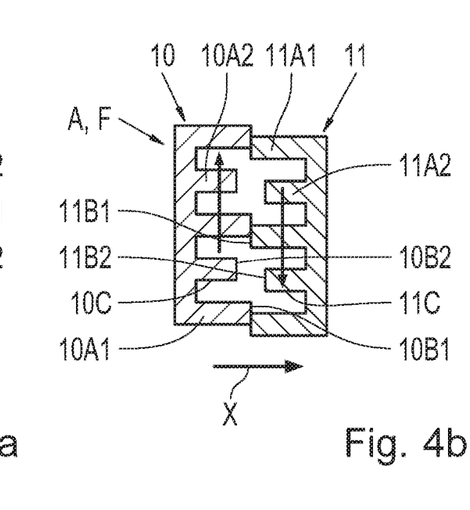

Initially, the completely disengaged operating condition of the shift element A or F is represented in FIG. 4a. FIG. 4b shows the operating condition of the form-locking shift element A or F during a rattling operation. During the rattling operation, the shift-element halves 10 and 11 glide off of one another, in the area of the end faces 10B1 and 11B1 of the longer dog elements 10A1 and 11A1, respectively, in the circumferential direction. Therefore, the positive engagement between the shift-element halves 10 and 11 cannot be established. This rattling operation can be prevented or ended to the extent described with reference to FIG. 3b by reducing the differential speed between the shift-element halves 10 and 11.

Figure 4C:
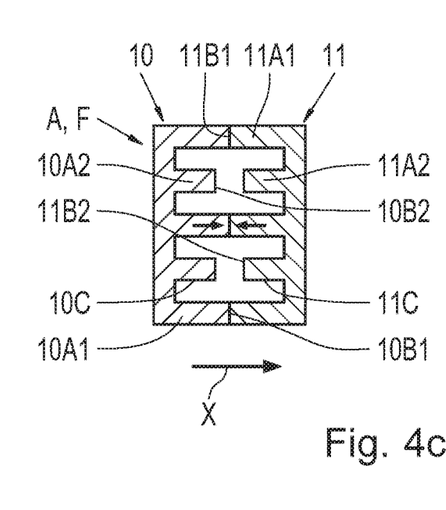
Figure 4D:
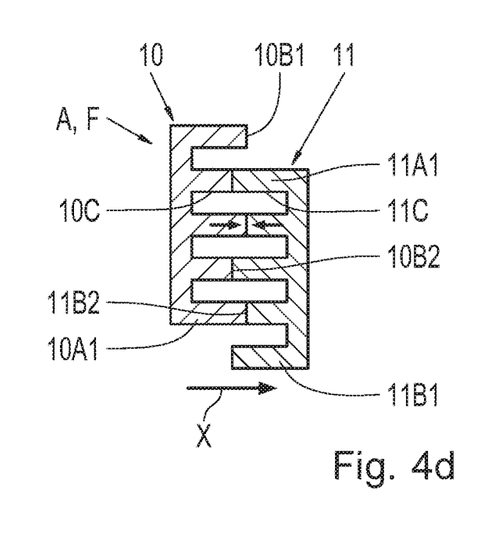

Moreover, FIG. 4c and FIG. 4d each show a tooth-on-tooth position, which prevents the establishment of the positive engagement between the shift-element halves 10 and 11. In the operating condition of the form-locking shift element A or F represented in FIG. 4c, the tooth-on-tooth position is between the end faces 10B1 and 11B1 of the longer dog elements 10A1 and 11A1, respectively. In contrast thereto, the tooth-on-tooth position between the shift-element halves 10 and 11 in the operating condition of the form-locking shift element A or F represented in FIG. 4d is between the end faces 11B1 of the longer dog elements 11A1 of the shift-element half 11 and the end faces 10B2 of the shorter dog elements 10A2 of the shift-element half 10.

Regardless thereof, the particular tooth-on-tooth position between the shift-element halves 10 and 11 can be released or prevented in the way described with respect to FIG. 3c.

Figure 4E:
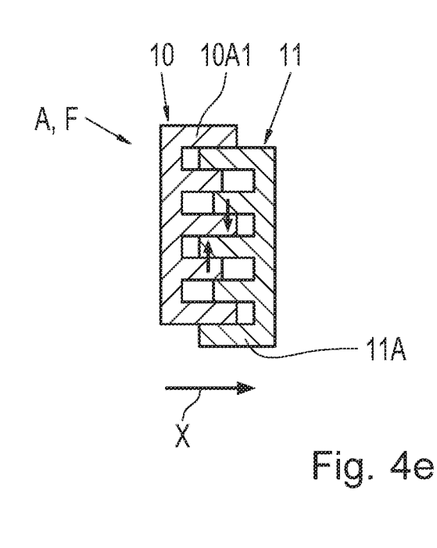

FIG. 4e shows an intermediate operating condition of the form-locking shift element A or F between the completely disengaged operating condition and the completely engaged operating condition of the form-locking shift element A or F. During this intermediate operating condition, the flank clamping—which is described in greater detail above—between the dog elements 10A1, 10A2 and the dog elements 11A1, 11A2, respectively, can occur. The flank clamping can be prevented or released to the extent described with reference to FIG. 3d in order to be able to disengage or engage the form-locking shift element A or F to the demanded extent.

Figure 4F:
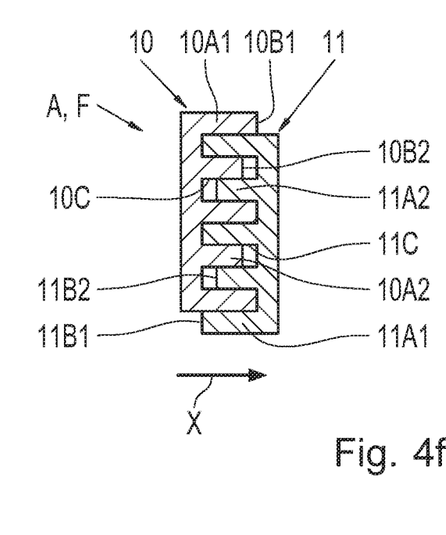

The completely engaged operating condition of the form-locking shift element A or F is represented in FIG. 4f.

An advantageous example variant of a learning routine is described in the following. With the aid of the learning routine, reference values corresponding to the end positions of the shift-element halves 10 and 11 shown in FIG. 3a and FIG. 3e, and in FIG. 4a and FIG. 4f, respectively, can be determined by sensors associated with the form-locking shift elements A and F. The learning routine is initially carried out, starting from a completely disengaged operating condition of the form-locking shift element A or F, in the direction of the completely engaged operating condition of the form-locking shift element A or F. During this operating condition change of the form-locking shift element A or F, the end positions of the shift-element halves 10 and 11 corresponding to the engaged operating condition of the form-locking shift element A or F are determined. Thereafter, the learning routine is carried out for the operating condition change of the form-locking shift element A or F starting from the completely engaged operating condition in the direction of the completely disengaged operating condition. During this operating condition change of the form-locking shift element A or F, the end positions of the shift-element halves 10 and 11 are determined that correspond to the completely disengaged operating condition of the form-locking shift element A or F.

In the example embodiment of the form-locking shift elements A and F, in which only one of the two shift-element halves 10 or 11 is designed to be displaceable in the axial direction with respect to the other shift-element half 11 or 10, only the axial actuating movement of the movable shift-element half 10 or 11 is monitored with the aid of the particular associated sensor. If both shift-element halves 10 and 11 are designed to be movable with respect to one another in the axial direction, however, the actuating movements of the shift-element halves 10 and 11 are monitored with the aid of the associated sensor. The end positions of the shift-element halves 10 and 11 can be determined via the learning routine regardless of which end positions of the shift-element halves 10 and 11 are determined first.

During the determination of the reference values of the sensor, which, in the completely engaged operating condition of the form-locking shift element A or F, correspond to the end positions of the shift-element halves 10 and 11, the differential speed between the shift-element halves 10 and 11 at the instant of engagement is guided to values within the differential speed range necessary therefor. Thereupon, the differential speed between the shift-element halves 10 and 11 has values close to the synchronous speed of the form-locking shift element A or F. This measure ensures, on the one hand, that the form-locking shift element A or F can be reliably engaged and, on the other hand, that a rattling operation and, therefore, damage of the form-locking shift element A or F is prevented.

In the transmission 3 considered in the present case, the differential speed between the shift-element halves 10 and 11 of the form-locking shift elements A and F is implemented with the aid of an appropriate actuation of the friction-locking shift elements B through E.

Since there is the possibility of a tooth-on-tooth position and/or a flank clamping during the demanded engagement process of the form-locking shift element A or F, the form-locking shift element A or F is actuated in the way described in greater detail in the following. So-called countermeasures against potential tooth-on-tooth positions and against a potential flank clamping are implemented in this case. This is necessary, since the actuating movement of the shift-element half 10 or 11 or of both shift-element halves 10 and 11 in the engagement direction is zero during a tooth-on-tooth position as well as during a flank clamping. Thereupon, it is possible that the particular current position of the shift-element half 10 and/or 11 is erroneously considered by the sensor to be the position that corresponds to the completely engaged operating condition of the form-locking shift element A or F.

For this reason, the torque present at the form-locking shift element A or F during the engagement process is raised before the meshing of the shift-element halves 10 and 11, i.e., before an overlap forms between the dog elements 10A and 11A or 10A1 and 11A1, and, additionally, the axial engagement force is reduced, in order to release or prevent a potential tooth-on-tooth position.

Thereafter, the torque present at the form-locking shift element A or F is reduced and the axial actuating force present at the shift element A or F in the engagement direction is increased if it is assumed that the shift-element halves 10 and 11 are in partial overlap with one another. Due to this approach, a potential flank clamping between the shift-element halves 10 and 11 is released or prevented.

The above-described measures ensure that the shift-element halves 10 and 11 of the form-locking shift element A or F reach the end positions corresponding to the completely engaged operating condition of the form-locking shift element A or F and the reference values of the sensor corresponding thereto are determined.

In order to determine the end positions of the shift-element halves 10 and 11 corresponding to the completely disengaged operating condition of the form-locking shift element A or F, the learning routine is carried out, starting from a completely engaged operating condition of the form-locking shift element A or F, to the extent described in greater detail in the following.

For this purpose, the completely engaged form-locking shift element A or F is initially actuated or activated in the disengagement direction with the maximum possible actuating force. Simultaneously, the torque present at the form-locking shift element A or F is reduced to the greatest possible extent. The reduction of the torque present at the form-locking shift element A or F can take place, for example, by disengaging all shift elements B through E and A or F. In such an operating condition of the transmission 3, the power flow in the transmission 3 between the transmission input shaft 5 and the transmission output shaft 6 is interrupted and, therefore, the torque present at the form-locking shift element A or F is minimal. With the aid of this approach, it is very likely ensured that the form-locking shift element A or F is transferred into its completely disengaged operating condition and the sensor faultlessly determines the end positions of the shift elements 10 and 11.

The particular determined reference values, which correspond to the disengaged operating condition and to the engaged operating condition of the form-locking shift element A or F, are stored for the interim in a memory provided for this purpose.

In order to prevent a faulty determination of these end positions of the shift-element halves 10 and 11, it can be provided that the learning routine is carried out several times in succession. The particular determined end positions of the shift-element halves 10 and 11 of the form-locking shift elements A and F are compared to one another. If the particular determined reference values of the sensors deviate only slightly from one another, it is assumed that a determination of the reference values is sufficiently accurate. Thereafter, the reference values are stored in a non-volatile memory of a control unit, preferably of the transmission control unit.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 1 vehicle drive train
2 prime mover
3 transmission
4 driven end
5 transmission input shaft
6 transmission output shaft
7 torsion damper
8 hydrodynamic torque converter
9 torque converter lockup clutch
10, 11 shift-element half
10A, 10A1, 10A2 dog element
11A, 11A1, 11A2 dog element
10B, 10B1, 10B2 end face of the dog element
10C flank of the dog element
11B, 11B1, 11B2 end face of the dog element
11C flank of the dog element
"1" to "9" transmission ratio for forward driving
A to F shift element
P1 to P4 planetary gear set
"R" transmission ratio for travel in reverse

The invention claimed is:

1. A method for determining reference values of a sensor, the reference values corresponding to a disengaged operating condition or to an engaged operating condition of a form-locking shift element (A, F), at least one operating parameter of the form-locking shift element (A, F) determinable during a disengagement and during an engagement of the form-locking shift element (A, F), the method comprising:

varying a torque present at the form-locking shift element (A, F), an actuation force of the form-locking shift element (A, F), and a differential speed between shift-element halves (10, 11) of the form-locking shift element (A, F) while determining the reference values of the sensor such that the form-locking shift element (A, F) is transferred into the disengaged operating condition or into the engaged operating condition.

2. The method of claim 1, wherein the actuation force is greater than a threshold value and acts in a disengagement direction of the form-locking shift element (A, F), and the actuation force is applied to the form-locking shift element (A, F) while determining the reference values of the sensor that correspond to the disengaged operating condition of the form-locking shift element (A, F).

3. The method of claim 1, wherein varying the torque present at the form-locking shift element (A, F) comprises adjusting the torque present at the form-locking shift element (A, F) to less than a threshold value while determining the reference values of the sensor that correspond to the disengaged operating condition of the form-locking shift element (A, F).

4. The method of claim 1, wherein, while determining the reference values of the sensor that correspond to the engaged operating condition of the form-locking shift element (A, F), varying the differential speed between the shift-element halves (10, 11) of the form-locking shift element (A, F) comprises adjusting the differential speed between the shift-element halves (10, 11) to within a speed range that encompasses a zero point and in which the shift-element halves (10, 11) are engageable with each other in a form-fitting manner.

5. The method of claim 1, wherein varying the torque present at the form-locking shift element (A, F) comprises adjusting the torque present at the form-locking shift element (A, F) to greater than a threshold value while determining the reference values of the sensor that correspond to the engaged operating condition of the form-locking shift element (A, F) and before a positive engagement between the shift-element halves (10, 11), a tooth-on-tooth position between the shift-element halves (10, 11) does not occur at torques greater than the threshold value.

6. The method of claim 1, wherein varying the actuation force of the form-locking shift element (A, F) comprises adjusting the actuation force of the form-locking shift element (A, F) to less than a threshold value while determining the reference values of the sensor that correspond to the engaged operating condition of the form-locking shift element (A, F) and before a positive engagement between the shift-element halves (10, 11), a tooth-on-tooth position between the shift-element halves (10, 11) does not occur with actuation forces less than the threshold value, and the form-locking shift element (A, F) is transferable into the engaged operating condition with the actuation forces less than the threshold value.

7. The method of claim 1, wherein varying the torque present at the form-locking shift element (A, F) comprises adjusting the torque present at the form-locking shift element (A, F) to less than a threshold value while determining the reference values of the sensor that correspond to the engaged operating condition of the form-locking shift element (A, F) and with a positive engagement between the shift-element halves (10, 11), a flank clamping between the shift-element halves (10, 11) does not occur at torques less than the threshold value.

8. The method of claim 1, wherein varying the actuation force of the form-locking shift element (A, F) comprises adjusting the actuation force of the form-locking shift element (A, F) to greater than a threshold value while determining the reference values of the sensor that correspond to the engaged operating condition of the form-locking shift element (A, F) and with a positive engagement between the shift-element halves (10, 11), a flank clamping position between the shift-element halves (10, 11) does not occur with actuation forces greater than the threshold value, and the form-locking shift element (A, F) is transferable into the engaged operating condition with the actuation forces greater than the threshold value.

9. The method of claim 1, wherein the reference values of the sensor are repeatedly determined and the determined reference values are compared to one another, and the method further comprises saving the reference values when a deviation between the reference values is within a tolerance range.

10. The method of claim 1, wherein the operating parameter of the shift element (A, F) corresponds to a travel of one shift-element half (10 or 11) of the shift element, the one shift-element half (10 or 11) translatable with respect to the other shift-element half (11 or 10) of the form-locking shift element (A, F).

11. The method of claim 1, wherein the form-locking shift element (A, F) is a shift element of a transmission (3), the transmission (3) comprises friction-locking shift elements (B through E), and varying the torque present at the form-locking shift element (A, F) comprises actuating the friction-locking shift elements (B through E).

12. The method of claim 11, wherein the transmission (3) further comprises a transmission input shaft (5), and varying the torque present at the form-locking shift element (A, F) comprises adjusting a torque present at the transmission input shaft (5).

13. A control unit for determining reference values of a sensor, the reference values corresponding to a disengaged operating condition or to an engaged operating condition of a form-locking shift element (A, F), at least one operating parameter of the form-locking shift element (A, F) determinable during a disengagement and during an engagement of the form-locking shift element (A, F), the control unit configured for:
varying a torque present at the form-locking shift element (A, F), an actuation force of the form-locking shift element (A, F), and a differential speed between shift-element halves (10, 11) of the form-locking shift element (A, F) during the determination of the reference values of the sensor such that the form-locking shift element (A, F) is transferable into its disengaged operating condition or into the engaged operating condition.

14. The control unit of claim 13, wherein the control unit is programmed to carry out the method of claim 1 on a control side.

15. A computer program comprising program code stored on a non-transitory computer-readable medium with software instructions to carry out the method of claim 1 when executed on a control unit.

* * * * *